United States Patent [19]

Wu

[11] Patent Number: 5,450,234

[45] Date of Patent: Sep. 12, 1995

[54] BICYCLE WHEEL REFLECTOR ASSEMBLY

[76] Inventor: Ming-Hsiung Wu, No. 47, Lane 249, Sec. 4, Chang-Shui Rd., Pi-Tou Hsiang, Chang-Hua Hsien, Taiwan

[21] Appl. No.: 201,329

[22] Filed: Feb. 24, 1994

[51] Int. Cl.⁶ .............................................. G02B 5/12
[52] U.S. Cl. ..................................... 359/523; 359/522
[58] Field of Search ............... 359/515, 520, 522, 523, 359/550, 533

[56] References Cited

U.S. PATENT DOCUMENTS 4,691,992  9/1987  Lin et al. .......................... 359/523

Primary Examiner—Ricky D. Shafer
Assistant Examiner—James Phan
Attorney, Agent, or Firm—Bacon & Thomas

[57] ABSTRACT

A bicycle wheel reflector mounting device includes a headed fastening rod, and a reflector fastened to either spoke of a bicycle wheel by the headed fastening rod, wherein the reflector has a notched annular coupling flange attached to the spoke, inside annular flanges and longitudinal grooves in a through hole thereof. The headed fastening rod has a longitudinal split, which receives the spoke, two longitudinal ribs which engage the longitudinal grooves for causing the headed fastening rod to be compressed radially, and a hooked portion hooked up with the inside annular flanges.

2 Claims, 5 Drawing Sheets

5,450,234

BICYCLE WHEEL REFLECTOR ASSEMBLY

BACKGROUND OF THE INVENTION

The present invention relates to a mounting device which fastens a reflector to the spokes of a bicycle wheel quickly and stably.

The wheels of a bicycle are generally fastened with reflectors for reflecting light so as to prevent collision. FIGS. 1 and 2 show a structure of bicycle wheel reflector mounting device according to the prior art, which is comprised of a reflector having a through hole in the center and an elongated groove on one side, and a headed screw fastened to the through hole by a nut to hold down the spoke in the groove. One drawback of this structure of bicycle wheel reflector mounting device is that a hand tool is needed to fasten the headed screw and the nut together. Another drawback of this structure of bicycle wheel reflector mounting device is that the nut may disconnect from the headed screw easily when the bicycle runs over a rugged road surface.

FIG. 3 shows another structure of bicycle wheel reflector mounting device according to the prior art, which is comprised of a reflector having a center through hole and an annular outside flange around the center through hole at one side, a split plug member fitted into the annular outside flange and fastened in place by a screw permitting the spoke to be retained in two opposite notches on the annular outside flange. This structure of bicycle wheel reflector mounting device is complicated in structure, and therefore its manufacturing cost is relatively high.

SUMMARY OF THE INVENTION

The present invention eliminates the aforesaid drawbacks. It is therefore one object of the present invention to provide a bicycle wheel reflector mounting device which is easy to install without the use of any hand tools. It is another object of the present invention to provide a bicycle wheel reflector mounting device which is simple in structure and inexpensive. It is still another object of the present invention to provide a bicycle wheel reflector mounting device which can firmly retain the reflector to the spokes of a bicycle wheel.

According to the preferred embodiment of the present invention, the bicycle wheel reflector mounting device comprises a reflector having a notched annular coupling flange attached to either spoke of a bicycle wheel, inside annular flanges and longitudinal grooves in a through hole thereof, and a headed fastening rod having a longitudinal split, which receives the spoke, two longitudinal ribs engaged into the longitudinal grooves causing the headed fastening rod to be compressed radially, and a hooked portion hooked up with the inside annular flanges. Simply by inserting the headed fastening rod into, the through hole on the reflector in the correct direction, the reflector is fastened to the spoke firmly without the use of any hand tool.

DETAILED DESCRIPTION OF THE PREFERRED EMBODIMENT

Figure 1:
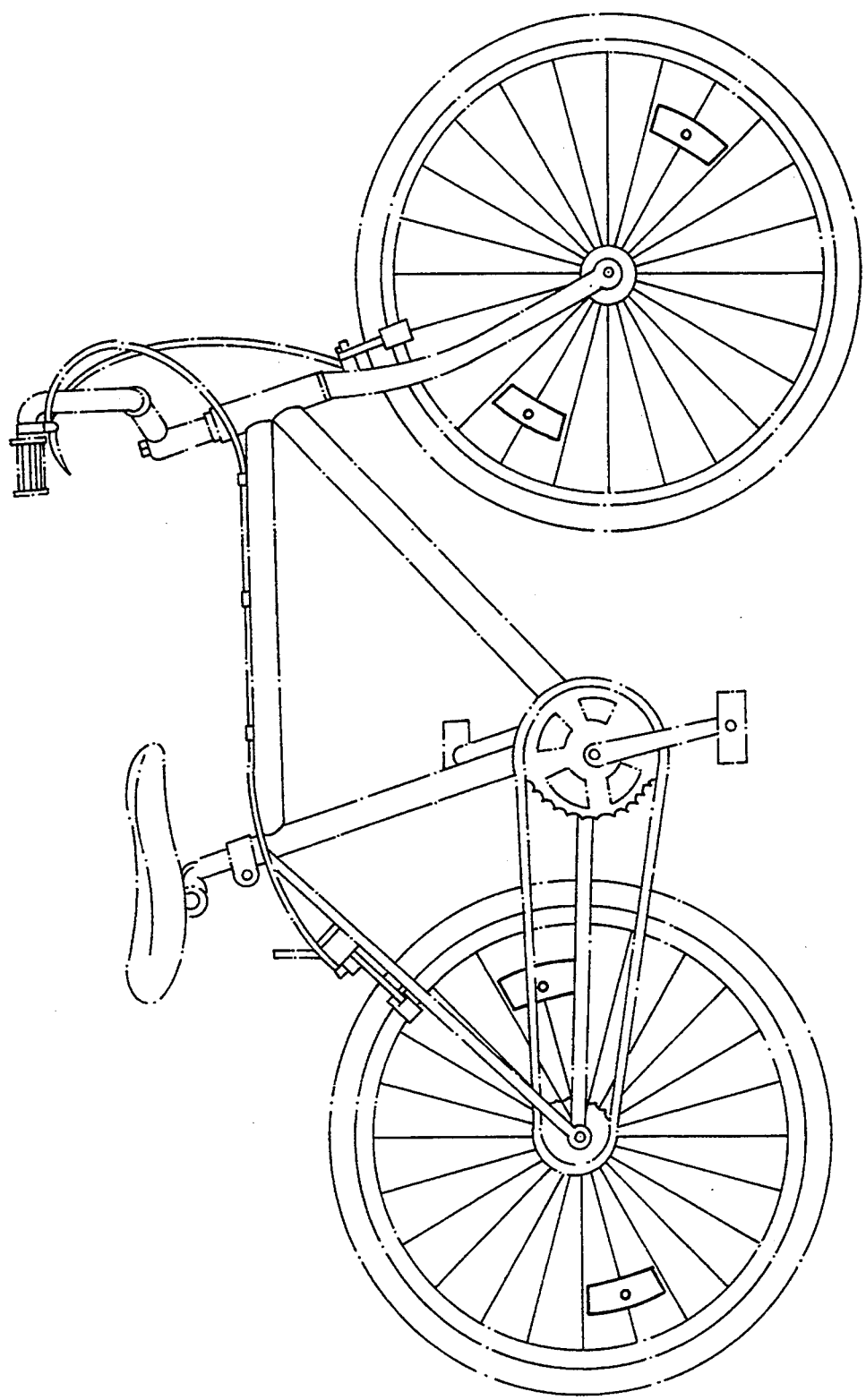
FIG. 1 shows a bicycle having prior art reflectors fastened to the spokes of the wheels.
Figure 2:
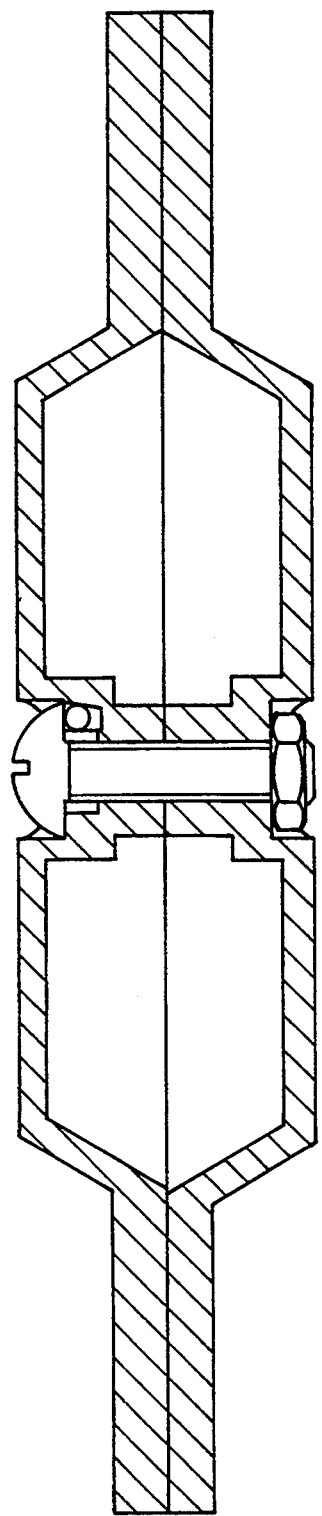
FIG. 2 is a sectional assembly view of a bicycle wheel reflector mounting device according to the prior art.
Figure 3:
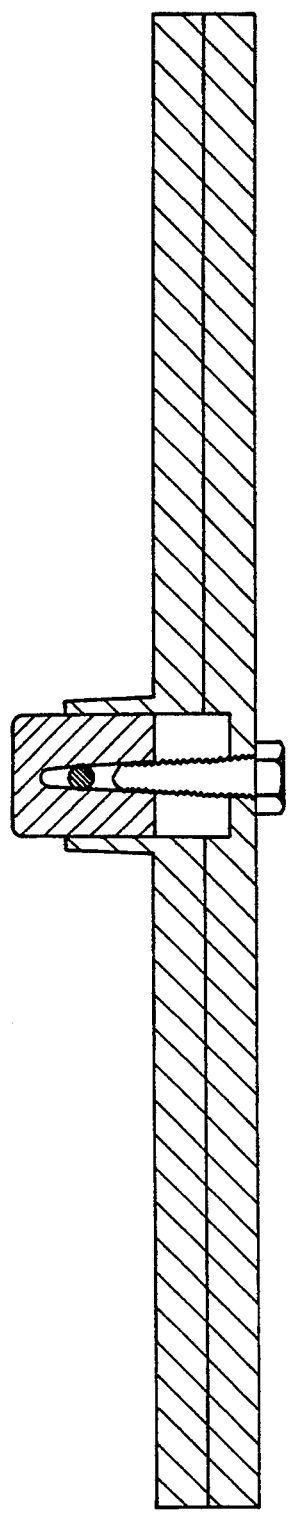
FIG. 3 is a sectional assembly view of another structure of bicycle wheel reflector mounting device according to the prior art.
Figure 4:
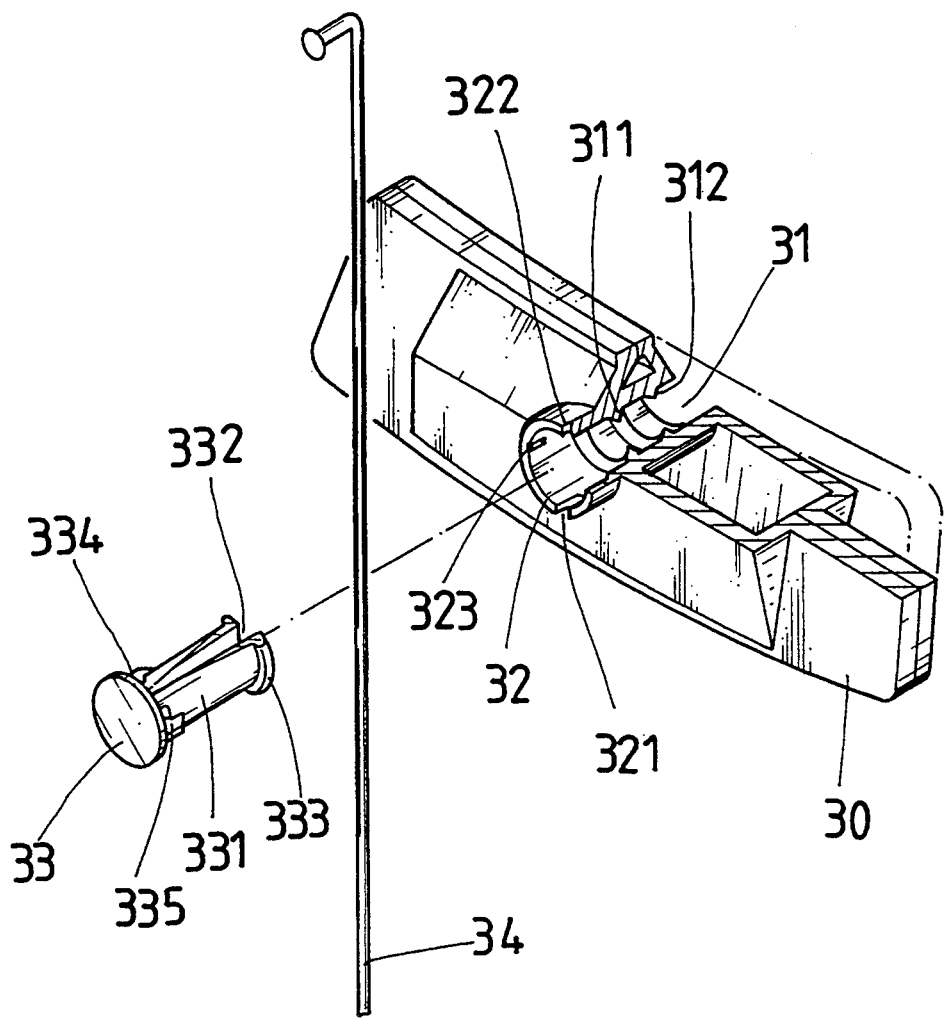
FIG. 4 is an exploded view of a bicycle wheel reflector mounting device according to a preferred embodiment of the present invention.
Figure 5:
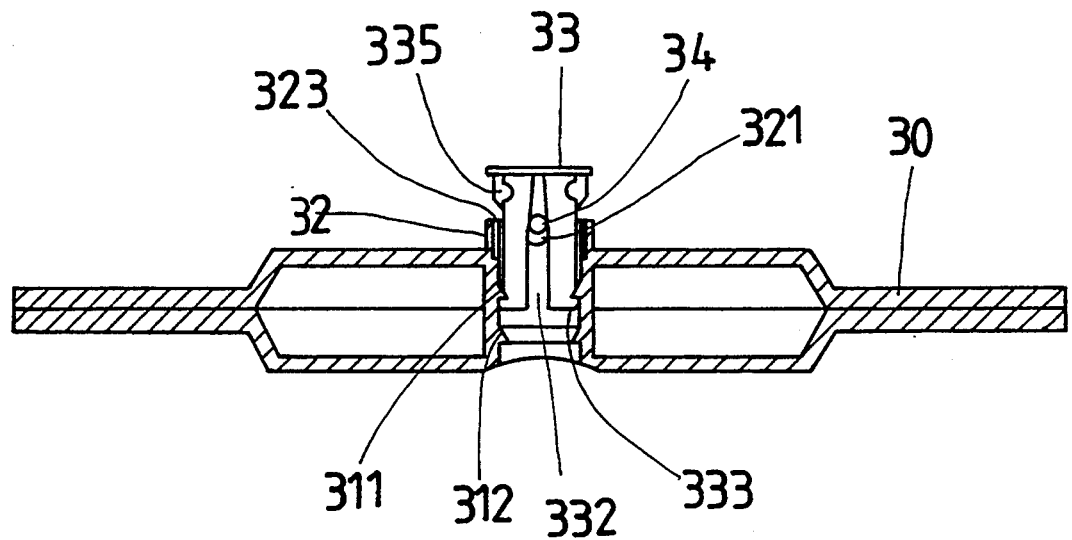
FIG. 5 is a sectional assembly view of the bicycle wheel reflector mounting device of the preferred embodiment of; the present invention, showing the hooked portion of the headed fastening rod passed through the first inside annular flange.
Figure 6:
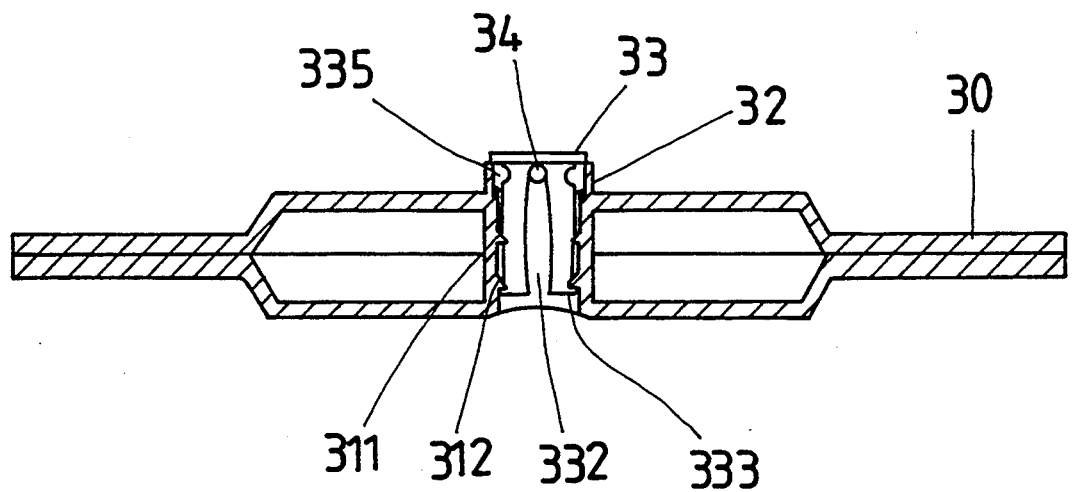
FIG. 6 is similar to FIG. 5 but showing the hooked portion of the headed fastening rod hooked up with the second inside annular flange.

Referring to FIGS. 4, 5, and 6, the reflector, referenced by 30, is fastened to either spoke 34 of a bicycle wheel by a headed fastening rod 33. The reflector 30 comprises a through hole 31 in the center, an annular coupling flange 32 extending outwardly from one side thereof around the through hole 31, and two spaced inside annular flanges, namely, the first inside annular flange 311 and the second inside annular flange 312 extending around the peripheral wall of the through hole 31. The annular coupling flange 32 comprises two diametrically opposed notches 321,322, which receive the spoke 34, two diametrically opposed longitudinal grooves 323. As seen in FIG. 4, notches 321,322 are offset 90 degrees from grooves 323. The width of one notch 321 is preferably made wider than the diameter of the spoke 34 while the width of the other notch 322 is made approximately equal to the diameter of the spoke 34, and therefore the angular position of the reflector 30 on the spoke 34 can be adjusted after the spoke 34 is received in the notches 321,322. The headed fastening rod 33 comprises a split body 331 having a longitudinal split 332 in the middle, a hooked portion 333 at one end of the split rod body 331, a head 334 at an opposite end of the split rod body 331, and two opposite longitudinal ribs 335 raised from the split rod body 331 near the head 334. When reflector 30 is attached to the spoke 34 permitting the spoke 34 to be received in the notches 321,322, the headed fastening rod 33 is inserted into the through hole 31, thus permitting the spoke 34 to be received in the split 332. When the hooked portion 333 passes through the first inside annular flange 311, the position of the reflector 30 on the spoke 34 is still allowed to be adjusted (because the width the notch 321 is wider than the diameter of the spoke 34). When the hooked portion 333 passes through the second inside annular flange 312 the longitudinal ribs 335 engage the longitudinal grooves 323, thereby causing the split rod body 331 to be squeezed to close the split 332, and at the same time the hooked portion 333 becomes hooked up with the second inside annular flange 312.

I claim:

1. A bicycle wheel reflector assembly comprising:
   a) a reflector and a fastening rod for securing the reflector to a spoke of a bicycle wheel;
   b) the reflector including a hole formed therethrough, an annular coupling flange extending outwardly from a side of the hole, the coupling flange being provided with a pair of diametrically opposed notches and a pair of diametrically opposed grooves, the notches being offset 90 degrees from the grooves, the hole including an interior wall, first and second annular flanges extending inwardly from the interior wall of the hole and spaced from each other, with the first annular flange being positioned between the coupling flange and the second annular flange;

c) the fastening rod including first and second ends, the first end being provided with a head and a pair of diametrically opposed ribs positioned inwardly of the head, the second end including a hooked portion, and a longitudinal split extending from the hooked portion towards the head; and d) whereby the assembly is secured to the spoke by engaging the spoke within the opposed notches, axially inserting the fastening rod into the hole so that the spoke is engaged within the longitudinal split and the hooked portion is positioned beyond the second annular flange, thereby causing the longitudinal split of the rod body to be squeezed together and dispose the pair of opposed ribs within the pair of opposed grooves.

2. The assembly of claim 1 wherein the opposed notches are of different widths for permitting adjustment of the reflector on the spoke after the hooked portion is disposed beyond the first annular flange.

* * * * *